United States Patent [19]

Bricot et al.

[11] Patent Number: 4,556,966
[45] Date of Patent: Dec. 3, 1985

[54] INFORMATION CARRIER DISK WITH ANGULAR CODING MEANS AND A SYSTEM FOR DRIVING SAID DISK IN ROTATION

[75] Inventors: Claude Bricot; Pierre Berthet; Bruno Mertz; Jean-Louis Gèrard, all of Paris, France

[73] Assignee: Thomson-CSF, Paris, France

[21] Appl. No.: 372,333

[22] Filed: Apr. 27, 1982

[30] Foreign Application Priority Data

Apr. 27, 1981 [FR] France .................................. 81 08333

[51] Int. Cl.⁴ ........................... G11B 7/24; G11B 7/00
[52] U.S. Cl. ........................................ 369/52; 369/50; 369/275
[58] Field of Search ............ 369/50, 44, 47, 189, 369/239, 275, 52; 358/342; 360/73, 77

[56] References Cited

U.S. PATENT DOCUMENTS

| | | | |
|---|---|---|---|
| 3,701,846 | 10/1972 | Zenzefilis | 358/342 X |
| 3,707,600 | 12/1972 | Schauffele et al. | 358/342 X |
| 4,000,510 | 12/1976 | Cheney et al. | |
| 4,079,942 | 3/1978 | Kunen | |
| 4,094,013 | 6/1978 | Hill et al. | 360/77 |
| 4,142,209 | 2/1979 | Hedlund et al. | 360/77 |
| 4,338,683 | 7/1982 | Furukawa et al. | 369/50 |
| 4,363,116 | 12/1982 | Kleuters et al. | 369/47 X |
| 4,365,324 | 12/1982 | Michaelis | 369/44 |
| 4,445,144 | 4/1984 | Giddings | 369/44 |

FOREIGN PATENT DOCUMENTS

| | | | |
|---|---|---|---|
| 1231454 | 4/1965 | Fed. Rep. of Germany | 369/52 |
| 1231455 | 4/1965 | Fed. Rep. of Germany | 369/52 |
| 2102876 | 8/1972 | Fed. Rep. of Germany | |
| 2521821 | 11/1975 | Fed. Rep. of Germany | |
| 2217771 | 9/1974 | France | |
| 2312091 | 12/1976 | France | |
| 574557 | 1/1946 | United Kingdom | 369/275 |
| 2062905 | 5/1981 | United Kingdom | |

Primary Examiner—Raymond F. Cardillo, Jr.
Assistant Examiner—Steven R. Garland
Attorney, Agent, or Firm—Oblon, Fisher, Spivak, McClelland & Maier

[57] ABSTRACT

The angular velocity of an information element contained in the precut track of an information carrier disk is controlled by means of a concentric circular ring located internally with respect to the precut track and constituted by mark zones uniformly spaced in angular sectors. A light beam is projected onto the circular ring and the emergent beam is modulated as a function of the mark zones and blank zones which form the circular ring. Errors arising from eccentric displacement of the track can thus be corrected and the rate of travel of information can be controlled in relation to the reading or recording light beam.

8 Claims, 9 Drawing Figures

INFORMATION CARRIER DISK WITH ANGULAR CODING MEANS AND A SYSTEM FOR DRIVING SAID DISK IN ROTATION

BACKGROUND OF THE INVENTION

1. Field of the Invention

This invention relates to systems for driving an information carrier disk in rotation. The invention is more particularly concerned with drive systems in which the speed of rotation of a system is governed by a control loop comprising an optical detector for detecting the movement of rotation of the disk spindle. Said spindle can also be driven by a direct-current motor.

2. Description of the Prior Art

Rotation of the spindle is detected optically by mounting a wheel on the latter, the wheel being provided with a set of teeth having a uniform pitch; this set of teeth is placed on the path of a light beam and a photodetector device collects the beam modulated by the teeth. The inherent drawback which is attached to the use of a coding wheel arises from defective mounting of this latter on the spindle. These defects result in eccentric displacement of the wheel with respect to the spindle, to which there can be added another eccentric displacement caused by imperfect centering of the information carrier disk at the opposite end of said spindle. During the process involved in obtaining a precut disk, it is known that the axis of the tracks and the mechanical axis of the disk do not coincide. A difference of the order of 100 microns between the two axes is commonly observed and this results in an appreciable variation in linear velocity during rotation of the disk. When the control loop adjusts the angular speed of rotation of the spindle, a track carried by the information disk is liable to be scanned at a variable rate. This explains the difficulty involved in transcribing an isochronous signal on said track.

SUMMARY OF THE INVENTION

In order to overcome these disadvantages, the present invention is directed to a carrier in the form of a disk having at least one face for the storage of optically readable information which occupies an annular band of the carrier disk, said disk being provided with a centering hole within the interior of said annular band. The distinctive feature of the invention lies in the fact that provision is made for a precut circular ring located internally with respect to said annular band and surrounding said central hole. Said circular ring is constituted by a string of zones forming a periodic arrangement of angular sectors, each zone being provided with a set of equidistant track elements, two adjacent zones being separated by an uncut portion of said disk face.

Said optical-reading disk can be either flexible or rigid, either transparent or reflecting, and the diffracting elements can be recorded either in amplitude modulation or in phase modulation.

BRIEF DESCRIPTION OF THE DRAWINGS

These and other features of the invention will be more apparent upon consideration of the following description and accompanying drawings, in which.

DETAILED DESCRIPTION OF THE PREFERRED EMBODIMENTS

Figure 1:
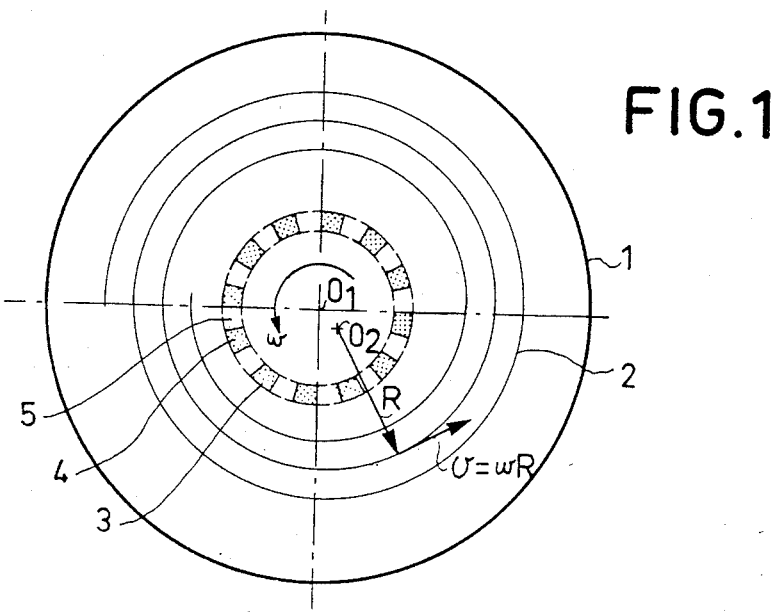
FIG. 1 is a top view of an information carrier disk with its precut circular ring according to the invention.

In FIG. 1, a flexible or rigid information carrier 1 in the form of a disk is illustrated by way of example without any limitation being implied. A spiral 2 shown partially and centered on $O_1$ has been precut in an annular band of the disk. Said spiral is intended to receive the information in the form of diffracting elements having small dimensions. An elementary information point has a dimension of the same order of magnitude as the wavelength employed for recording or reading. The last tracks of the spiral 2 (a few hundred in number) have been reserved for the fabrication of a circular ring 3 composed of a string of uniformly spaced mark zones. The fabrication of these mark zones does not give rise to any particular problem. The mark zones are composed of diffracting elements cut in the tracks. By way of example, said diffracting elements can be cut in a period of time corresponding to the duration of the mark zones and starting from a frequency of 3 MHz, thereby physically forming a succession of identical points along a portion of track. The cutting rate in this example is 750 rpm, the mark-writing frequency is 14 KHz, the circular ring has a mean diameter of 78 mm and a width of 0.4 mm. Said circular ring consists of an alternate arrangement of mark zones 4 and blank zones 5 which define identical angular sectors. The circular ring and the precut track which is intended to receive the information thus have the same center. During subsequent utilization of the disk, the center of rotation will no longer be $O_1$ but will be $O_2$, this center being located on the axis of the disk driving spindle.

Figure 2:
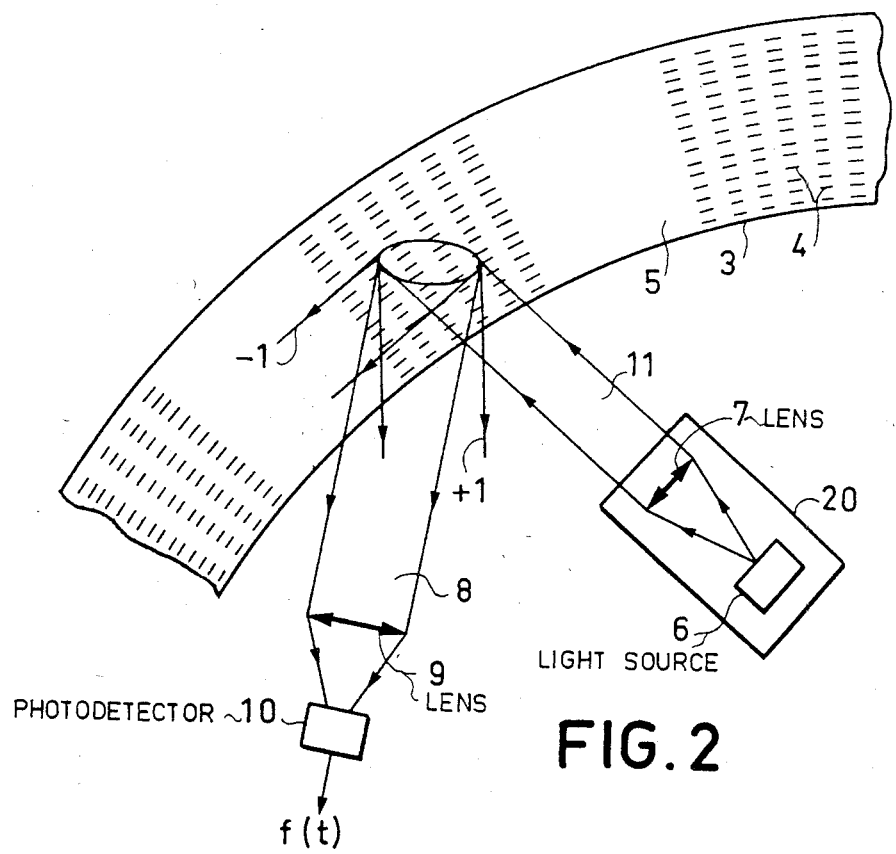
FIG. 2 shows the influence of the different portions constituting the circular ring on an incident light beam.

FIG. 2 shows the behavior of a light beam which is incident upon the circular ring of the rotating disk. This figure is a highly enlarged representation of a portion of the circular ring 3 formed of marks 4 and blank zones of diffracting elements 5.

A light source 6 illuminates a portion of the circular ring by means of a condenser 7. As it passes over a blank zone 5, the emergent light beam 8 is focused by the lens 9 onto the receiver 10 which delivers an electric signal as a function of the light intensity received. As it passes over a mark 4, the emergent light beam occupies a larger solid angle by reason of the appearance of diffracted components of order −1 and +1 and the receiver 10 receives at that time only a part of the energy contained in the emergent beam.

Figure 3:
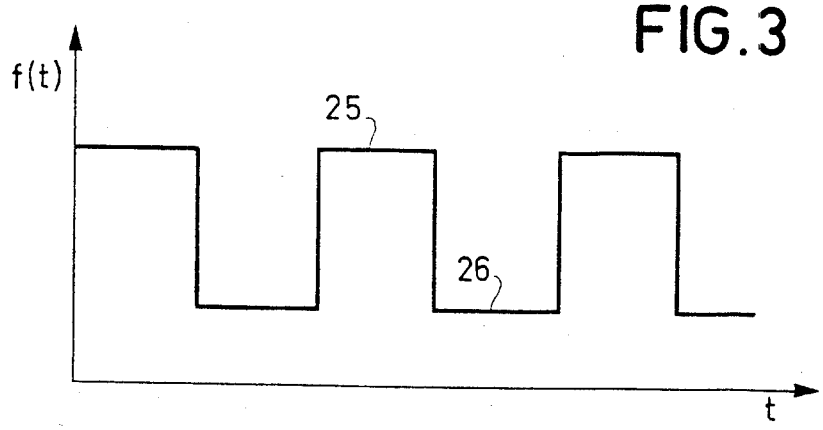
FIG. 3 shows the waveform of the electric signal delivered by the receiver after a portion of the circular ring has passed in front of the light beam.

FIG. 3 shows the waveform of the electric signal delivered by the receiver 10 at the time of scanning of the circular ring 3 by the light beam 11. Said electric signal is a function of time and has a square-topped waveform. The maximum signal levels or peaks 25 correspond to the passage of a blank zone 5 in front of the light beam 11 whilst the minimum signal levels or valleys 26 correspond to the passage of a mark 4. Since each mark or blank zone defines an angular sector which is geometrically identical with the other mark or blank zones of the circular ring, the mark zones will pass in front of the reading light beam 11 during a shorter or longer period of time according to the radial distance at which the mark or blank zones considered are located with respect to the center of the disk. The signal delivered by the receiver element 10 is therefore formed of pulses having different widths or, in other words, said signal f(t) is a rectangular-wave signal which is frequency-modulated as a function of the radial distance from the center.

By making use of available signals and known techniques, a signal can readily be applied to the information carrier drive motor in order to correct the speed of rotation of this latter and to control the angular velocity of the carrier. An imperative condition for correct operation of the system is that the spots formed on the carrier by the beam which illuminates the circular ring and by the information reading/recording beam should be located on the same radius of the carrier in order to produce an effective correction of the angular velocity of the zone considered. In a first embodiment of the invention, the light beam illuminates the ring in a circular spot of approximately 100 microns in diameter. In the case of the ring dimensions given earlier, the spot is always located within the ring since the maximum distance between the mechanical axis and the axis of rotation of the disk does not exceed 100 microns. The shape of the spot is not critical in regard to the operation of the system according to the invention but consideration could nevertheless be given to a spot which is elongated in the direction of a radius of the disk in order to reduce the rise and fall times of the signal which is picked-up by the receiver.

Figure 4:
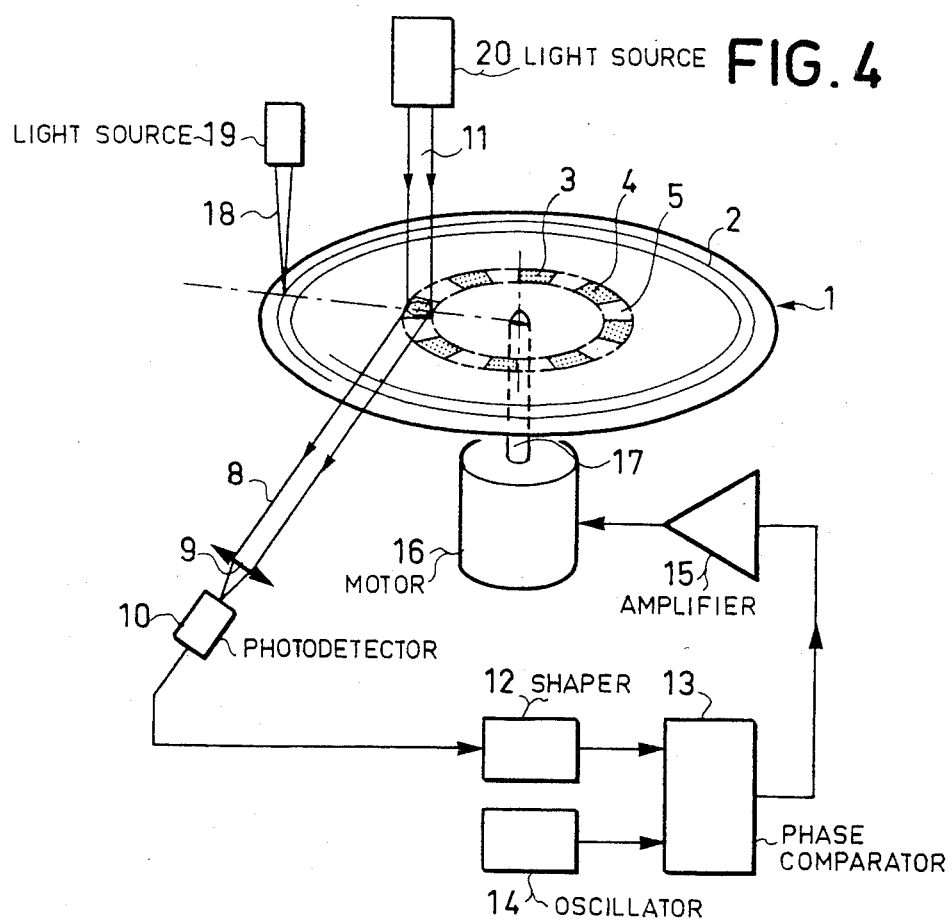
FIG. 4 is a schematic diagram showing the general arrangement of the electronic device for controlling the rate of scanning of a track containing the information.

Control of the speed of rotation of the carrier is carried out with respect to a pilot frequency. One example of execution is given in the schematic diagram of FIG. 4. This figure also shows a portion of the spiral 2 which has been precut on the disk 1 as well as the reading or recording beam 18 delivered by an optical system 19 (not shown in detail), the incident beam 11 delivered by the optical system 20 shown in detail in FIG. 2, the emergent beam 8, the lens 9 and the photoreceiver 10. The light beam 8 which emerges from the circular ring 3 is picked-up by a photoreceiver 10 and this latter delivers a rectangular-wave signal which is frequency-modulated at the frequency f(t) by the eccentricity of the disk to a shaping circuit 12. A frequency (or phase) discriminator 13 compares the signal delivered by the shaping circuit 12 with a reference signal delivered by a local oscillator 14 which can be constituted by a quartz oscillator followed by a frequency divider, for example. The output signal of said discriminator is applied through an amplifier 15 to the direct-current motor 16 which drives the information carrier disk 1 in rotation by means of the spindle 17.

Figure 5:
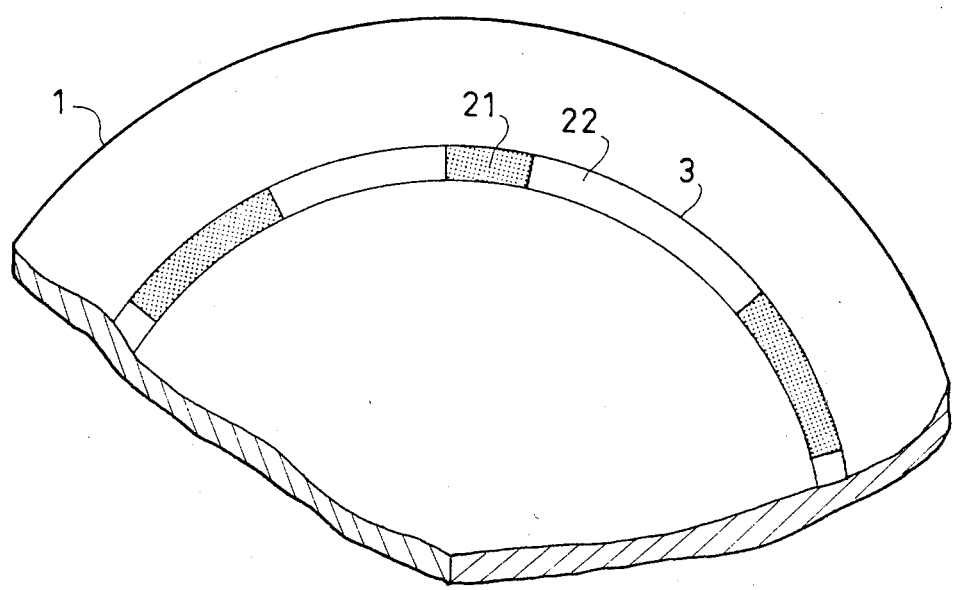
FIG. 5 is a partial view of the disk with its circular ring and shows one example of execution of the indexing operation.

It is also within the scope of the invention to provide an index marker on said precut circular ring in order to locate the zero index. This permits more convenient use of the information carrier. By means of an index marker of this type it is in fact possible to have a useful angular reference in order to localize the information sector by sector within the annular band in which this information is stored or intended to be stored. One mode of execution of the indexing operation consists in doubling the frequency of a mark zone over a spatial period of the circular ring. FIG. 5 is a partial view of the disk together with its circular ring 3 and shows one example of execution by doubling of the spatial frequency of a mark zone. On the location reserved for a mark, there has therefore been formed a mark zone 21 which occupies one quarter of an ordinary period and a blank zone 22 which occupies three quarters of an ordinary period. This very brief doubling of the frequency has only very little influence on the complete signal f(t) which is transmitted to the discriminator 13.

Figure 6:
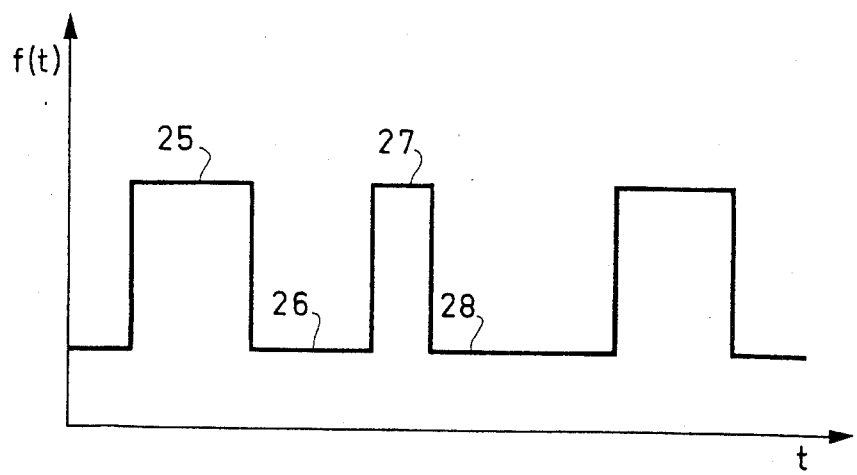
FIG. 6 shows the waveform of the electric signal delivered by the receiver after the light beam has passed over the indexing zone.
Figure 7:
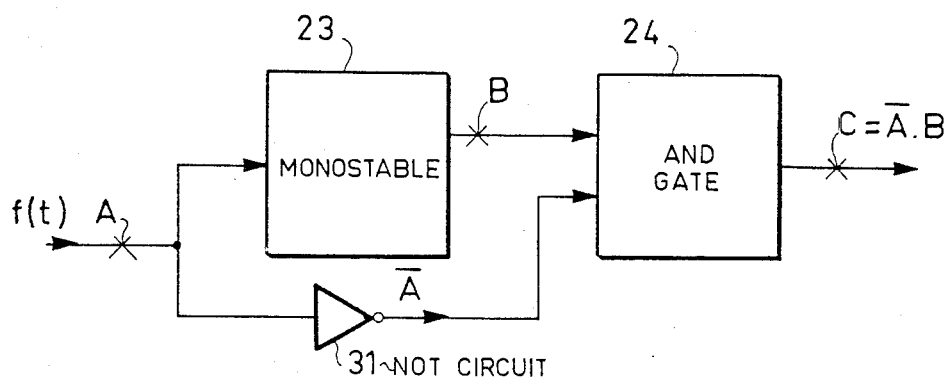
FIG. 7 shows one example of a circuit for detection of indexing.
Figure 8:
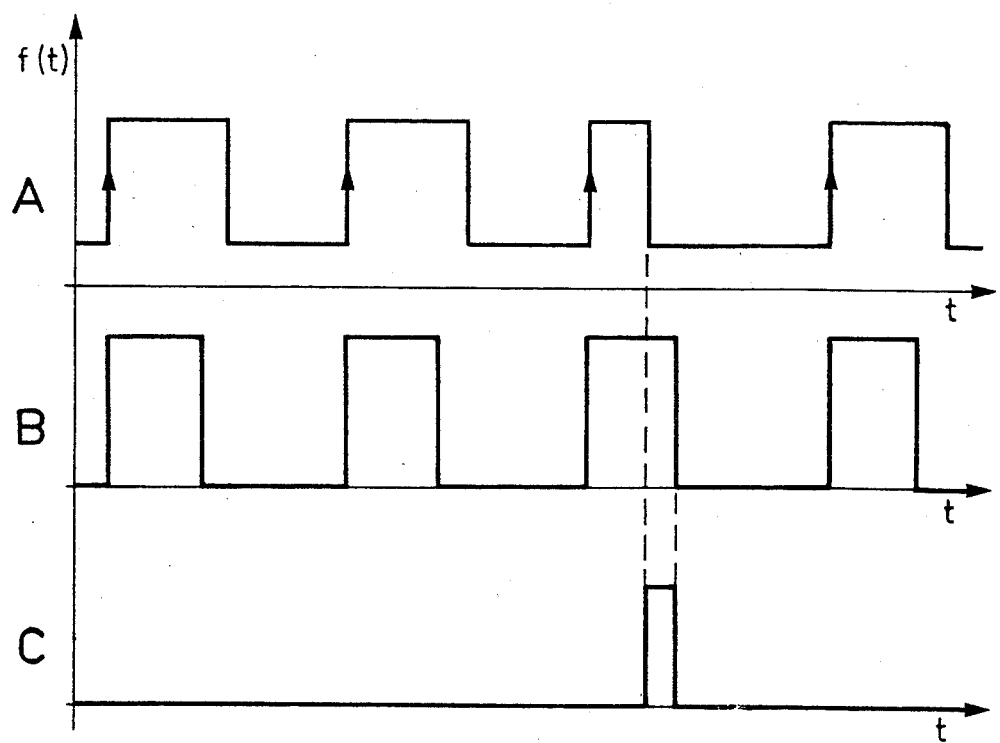
FIGS. 8a–c are diagrams in which the waveforms of the signals at different points of the indexing-detection circuit are plotted as a function of time.

FIG. 6 shows the waveform of the electric signal delivered by the receiver 10 after the light beam 11 has passed over the indexing zone. It is apparent from this figure that, as the beam passes in front of said indexing zone, the frequency of the signal f(t) formed by square waves having maximum levels 25 and minimum levels 26 has been doubled so as to produce a maximum level 27 followed by a minimum level 28. An identifying and separating system comprising a monostable multivibrator circuit serves to detect the indexing zone. FIG. 7 shows one example of construction. Part of the signal delivered by the receiver 10 is applied to the input of a monostable circuit 23 which changes state on the leading edges of the square waves which are applied to said circuit. The pulses delivered by the monostable circuit 23 are of shorter duration than any ordinary half-period of the signal f(t) but are of longer duration than the pulse produced by the presence of the index marker on the circular ring. An AND-gate 24 receives on a first input the output signal of the monostable circuit and on a second input the complement of the signal f(t) delivered by a circuit 31 which performs a NOT function. The waveforms of the signals at different points of the circuit shown in FIG. 7 are represented in FIG. 8 as a function of time. At the point C, the collected signal produces only one pulse per revolution of the disk. This single pulse permits angular position-locating of the information carrier disk.

Figure 9:
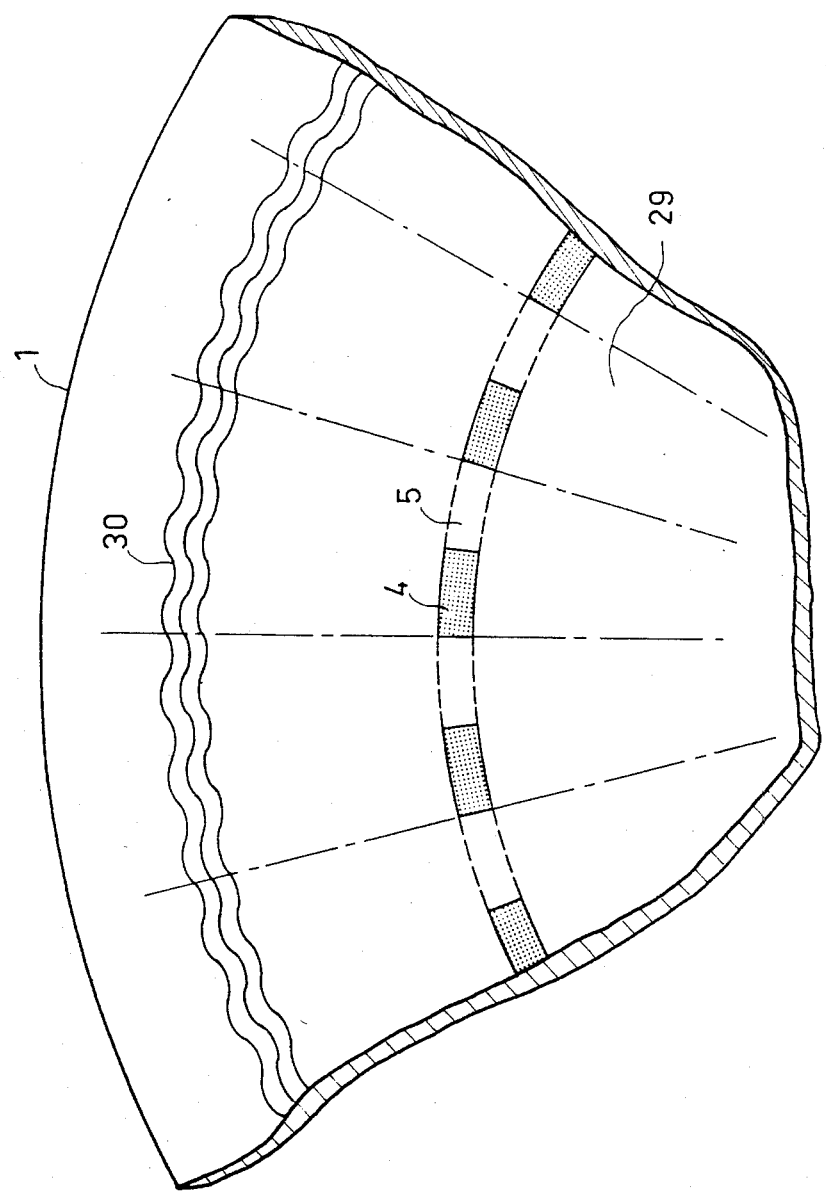
FIG. 9 is a partial view of the carrier disk showing a portion of wobbulated tracks and a portion of the circular ring.

An interesting development of the invention lies in the possibility of determining the reference frequency required for synchronous detection of a precut and wobbulated track. In fact, at the time of cutting of the matrix, it is an easy matter to cut the tracks and the circular ring in such a manner as to ensure that the mark-writing frequency and the wobbulation frequency are in a ratio which is a whole number. For example, the wobbulation frequency can be three times the mark-writing frequency. Reading of the circular ring produces a signal at a given frequency which, within the purview of the example given in the foregoing, can be tripled in order to obtain a reference signal for the required purpose of following the wobbulated track. FIG. 9 represents a partial view of a carrier disk according to the invention. It is apparent from this figure that an angular sector 29 defined by a mark zone 4 and a blank zone 5 comprises a whole number of spatial alternations (three alternations in the case considered in the figure) which define a precut and wobbulated portion of track 30.

The invention therefore makes it possible to form a coder on each carrier disk, said coder being readily obtained from a complete copy of the matrix. Centering of a coding zone on the axis of rotation of the carrier disk is always a difficult operation and has been dispensed with. Defects involving eccentric displacement are corrected even in the event of a substantial degree of displacement (50 to 100 microns). The concept of angular position-locating by indexing does not present any problem and a frequency which is representative of the wobbulated track can easily be found again by means of the frequency extracted from the circular ring.

What is claimed is:

1. A disk shaped data carrier having a centering hole and at least one prerecorded face wherein a first data is arranged along a set of turns having in common a geometric center, a first subset of said set of turns being allotted to the storage of said first data in adjacent track portions forming a pattern in registration with said first subset of turns, said prerecorded face comprising, around said centering hole;

a ring-shaped circular pattern of timing marks, wherein said marks are constituted by a second data which is related to a second subset of said set of turns with said second subset being separate and distinct from said first subset; said timing marks defining equal angular sectors bounded by radii crossing said common geometric center; each one of said angular sectors comprising at least one of said timing marks and a contiguous blank zone free from said second data, wherein said timing marks are made of strings of said second data arranged along the turns of said second subset.

2. Disk shaped carrier as claimed in claim 1, wherein the storage of data takes place within a ring shaped area of said prerecorded face; said ring shaped area surrounding said ring shaped circular pattern of timing marks.

3. Disk shaped data carrier as claimed in claim 1, wherein said blank zone occupies an angular portion in each one of said equal angular sectors wherein the angular portion occupied by said blank zone in one of said equal angular sectors is greater than the angular position occupied by said blank zone in any one of the remaining equal angular sectors.

4. Disk shaped data carrier claimed in claim 1, wherein wobble tracks are arranged in a ring shaped area; the spatial frequency of radial displacement in said wobble tracks being a multiple of the spatial recurrence frequency of said timing marks along said ring shaped circular pattern.

5. A system for optically scanning a data carrier having a centering hole and at least one prerecorded face wherein a first data is arranged along a set of turns having in common a geometric center, a first subset of said set of turns is allotted to the storage of said data in adjacent track portions forming a pattern in registration with said first subset of turns, said prerecorded face comprising, around said centering hole, a ring shaped circular pattern of timing marks, wherein said marks are consistuted by a second data related to a second subset of turns, distinct and separate from said first subset of turns, of said set and wherein said timing marks define equal angular sectors bounded by radii crossing said common geometric center with each of said angular sectors comprising one of said timing marks and a contiguous blank zone free from said second data, said system further comprising means for rotating said disk shaped data carrier, said means comprising a motor having a revolving motor spindle with a hub for fitting said centering hole, said motor being controlled with timing means for sensing said timing marks; said timing means comprising optical illumination means projecting beamed radiant energy interacting with said marks, and photodetector means for collecting the radiant energy having interacted with said timing marks; said system further comprising optical scan means for projecting a light spot separately illuminating any one of the first subset of turns allotted to the storage of said first data; the respective impact of said beamed radiant energy and of said light spot remaining substantially aligned with said common geometric center.

6. A system as claimed in claim 5, wherein said photodetector means comprises spatial filtering means for selectively transmitting the orders of diffraction of the radiant energy diffracted by said second data belonging to said timing marks.

7. A system as claimed in claim 5, wherein said photodetector means supply electrical means for selectively sensing an indexing mark located within a predetermined angular sector of said ring shaped circular pattern of timing marks.

8. A system as claimed in claim 5, wherein said photodetector means supply a read out signal fed to frequency multiplication means for delivering a reference signal; said system further comprising synchronous detector means receiving said reference signal and a further read out signal from the reading with a read out beam of a prerecorded wobble track; said synchronous detector means supplying a control signal to means for tracking said prerecorded track with said read out beam.

* * * * *

Notice of Adverse Decisions in Interference

In Interference No. 101,736, involving Patent No. 4,556,966, Claude Bricot, Pierre Berthet, Bruno Mertz, Jean L. Gerard, INFORMATION CARRIER DISK WITH ANGULAR CODING MEANS AND A SYSTEM FOR DRIVING SAID DISK IN ROTATION, final judgement adverse to the patentees was rendered Feb. 22, 1989, as to claims 1-4.

*(Official Gazette Oct. 22, 1991)*